(12) United States Patent
Nakagoshi

(10) Patent No.: US 7,289,257 B1
(45) Date of Patent: Oct. 30, 2007

(54) MOLDED LAMINATE FOR OPTICAL USE

(76) Inventor: Yasunobu Nakagoshi, 3-12, Shinoharakitmachi 1-chome, Nada-ku, Kobe-shi, Hyogo-ken 657-0068 (JP)

( * ) Notice: Subject to any disclaimer, the term of this patent is extended or adjusted under 35 U.S.C. 154(b) by 0 days.

(21) Appl. No.: 11/647,847

(22) Filed: Dec. 29, 2006

(30) Foreign Application Priority Data

Jul. 28, 2006 (JP) ............................. 2006-206226

(51) Int. Cl.
*G02F 1/03* (2006.01)
(52) U.S. Cl. ...................................... 359/241; 351/163
(58) Field of Classification Search ................ 359/241, 359/238, 240, 321; 351/163, 144; 252/582, 252/586; 428/697, 913
See application file for complete search history.

(56) References Cited

U.S. PATENT DOCUMENTS

| 6,650,473 | B2 | 11/2003 | Nakagoshi |
| 6,807,006 | B2 | 10/2004 | Nakagoshi |
| 7,036,932 | B2 | 5/2006 | Boulineau et al. |
| 7,048,997 | B2 | 5/2006 | Bhalakia et al. |

FOREIGN PATENT DOCUMENTS

| JP | 61-236521 | 10/1986 |
| JP | 08-109039 | 4/1996 |
| JP | 08-234147 | 9/1996 |
| JP | 2002-062423 | 2/2002 |
| JP | 2002-196103 | 7/2002 |
| JP | 2004-295114 | 10/2004 |
| JP | 2005-514647 | 5/2005 |
| JP | 2005-199683 | 7/2005 |
| WO | WO 03/058300 A1 | 7/2003 |

*Primary Examiner*—Timothy J. Thompson
(74) *Attorney, Agent, or Firm*—Duane Morris LLP

(57) ABSTRACT

A polarizing sheet (A) includes a polarizing film (2) and cellulose triacetate films (6, 6') bonded to opposing surfaces of the polarizing film (2) with adhesive layers (4, 4') interposed, respectively. A thermoplastic film (10) is stacked on the exposed surface of one (6') of the cellulose triacetate films. Another cellulose triacetate film (14) free of an ultraviolet absorber is bonded to the exposed surface of the other cellulose triacetate film (6) of the polarizing sheet with an adhesive (12) containing an organic photochromic compound, to thereby form a laminate sheet. The laminate sheet is placed in an injection mold, and a molding resin material fusible with the thermoplastic film (10) is injected over the thermoplastic film.

3 Claims, 2 Drawing Sheets

MOLDED LAMINATE FOR OPTICAL USE

The present invention relates to a molded laminate for use in manufacturing a lens, such as a polarizing lens and a sunglass lens, which exhibits a polarization property as well as a photochromic property such as to cause the laminate to exhibit variable light transmissivity by being colored by absorbing light and losing the color when light is blocked.

BACKGROUND OF THE INVENTION

Recently, in the spectacle lens market, demand for lenses which can protect eyes and are friendly to eyes has increased. Many of spectacle lenses have been glass lenses, but, in these days, plastic lenses are mainly used because plastic lenses can protect eyes from accidents which would be caused by broken lenses. Further, materials of plastic lenses have been improved so that the lenses can be hardly broken.

Lenses are required to have a high refractive index and be light and thin, be able to block harmful light to eyes by cutting ultraviolet rays or having a polarizing property, and have stable light-control property such that the color and light transmissivity of lenses can change in response to ambient brightness.

Improvement on thin lenses having high refractive index is being made by casting monomers containing sulfur or the like in molecules. Blocking of harmful light like ultraviolet light is realized by mixing an ultraviolet absorber with optical molding plastic materials. Glaringness to eyes is prevented by mixing an agent, which can absorb light at particular wavelengths, with the optical molding plastic materials, or providing secondary finishing to a lens surface, or providing a lens with a polarizing film.

In order to provide a lens with a color and optical transmissivity variable with ambient brightness, a compound exhibiting a photochromic property is used. Photochromic property or photochromism is the ability of a compound to rapidly change its color reversibly in response to light including ultraviolet rays.

Optical lenses exhibiting high stability and good performance are known as disclosed in JP 08-109039 A and JP 08-234147, which are formed by mixing an inorganic photochromic compound, e.g. Ag-bearing $TiO_2$ or caprous halide, with molten glass.

However, because these lenses are made of glass, they are easy to break and heavy, so that they are less effective in protecting eyes.

Because of the above-described problems with glass lenses, plastic lenses have replaced glass lenses. It was, however, impossible to mix an inorganic photochromic compound with plastic lens materials to produce transparent lenses. Organic photochromic compounds compatible with many of plastic lens materials have been developed recently, and plastic photochromic lenses with good performance have been developed by the use of such organic photochromic compounds. JP 2004-295114 A, JP 2005-514647 A, and JP 2005-199683 A have proposed plastic lenses having their surfaces coated with a coating material with an organic photochromic compound mixed therewith.

Major object of coating the plastic lens with such coating material is to protect the lens base against scratches. The thickness of the coating of most lenses is 5µ or less. This small thickness is caused by difficulty in forming a thick, uniform coating over a curved surface of lens, but such small thickness is sufficient for desired protection of lenses against scratches. In order to provide sufficient photochromism to the coating, it is necessary to add a considerable amount of an organic photochromic compound to the coating material, which may reduce scratch-preventing ability desired for the coating and may reduce adhesion of the coating to the lens base.

JP 61-236521 A discloses a method of producing lenses by casting a typical plastic lens resin material with an organic photochromic compound added to it. A major constituent of most of the resin materials cast shown in this publication low-cost vinyl monomer, and, therefore, the strength of the resulting lenses is too small to protect eyes. They are weak against shock and, therefore, easily broken. In addition, such material requires a large amount of organic photochromic compound to be added, which results in high costs of the resultant products. Recently, lenses made by casting urethane prepolymer which are hard to crack are available, but urethane prepolymer requires a curing time four or five times as long as that of vinyl monomer resins, which means that the productivity of urethane prepolymer lenses is low, and, therefore, the costs of urethane prepolymer lenses are very high.

Recently, many techniques for manufacturing, with improved productivity, optical lenses with organic photochromic compounds used therein, have been developed. For example, JP 2002-196103 A discloses a method of manufacturing a lens-shaped product by forming a laminate sheet including polycarbonate sheets bonded together by means of a urethane adhesive with an organic photochromic compound mixed therein, and thermally bending the laminate sheet into a lens shape. Also, JP 2002-062423 A proposes a laminate sheet including polycarbonate sheets between which a polyurethane resin layer with an organic photochromic compound mixed therein and a polarizing film are interposed.

The laminate sheets disclosed in these publications include an organic photochromic compound containing resin film sandwiched between polycarbonate sheets. The optical surface accuracy of the laminate sheets is not enough, and sunglasses made of the laminate sheets exhibit astigmatism. Therefore, in areas including Australia and Europe, the use of such sunglasses is prohibited.

U.S. Pat. No. 7,036,932 and No. 7,048,997 disclose a method of manufacturing photochromic and polarizing optical lenses by injection molding of optical molding resins. According to the methods disclosed in these U.S. patents, a laminate sheet is formed by preparing a transparent, thermoplastic resin film, which will provide a front surface of a resulting lens, bonding a film of transparent resin with an organic photochromic compound mixed therein to the rear surface of the front transparent, thermoplastic resin film, bonding a polarizing film to the rear surface of the photochromic compound containing film, and bonding a film of thermoplastic resin compatible with a molding resin to the rear surface of the polarizing film. Then, the resulting laminate sheet is subjected to hot bending to form it to have intended contours. The hot-bent laminate sheet is placed in a mold, and the molding resin is injected into the mold to thereby form a photochromic, polarizing optical lens.

The lenses made according to these two U.S. patents are generally satisfactory in optical performance and mechanical strength. However, the thermoplastic films used in these patents are made chiefly of polycarbonate resin, and, accordingly, are less chemically resistant. Therefore, when the lens is used in combination with a plastic frame, a plasticizer in the frame may attack the lens and cause cracks over the entire surface of the lens. Further, since the polarizing film used is formed of a polyvinyl alcohol film dyed with a dichromatic dyestuff to provide the lens with a color in addition to polarizing ability, the lens as a whole exhibits a dark color, and, even the light transmissivity of even a transparent lens is only about 30%. In order to obtain a light transmissivity of about 40%, the polarization degree decreases to 90% or smaller. This means that the lens cannot exhibit polarizing ability. Furthermore, a photochromic compound used with such dark polarizing lens provides the lens with a narrow range of color change, so that the highest performance as a photochromic lens can hardly be exhibited.

WO 01/077723, JP 2005-215640 A, and U.S. Pat. No. 6,814,896 disclose a method of producing a photochromic lens by embedding, in a thermosetting resin, a lens sheet including polycarbonate sheets and a thermosetting polyurethane layer containing a photochromic compound disposed between the polycarbonate sheets. However, the major constituent of the lenses produced by these methods is polycarbonate, and, therefore, the lenses are less chemically resistant. Therefore, when the lens is used in combination with a plastic frame, a plasticizer in the frame may attack the lens and cause cracks over the entire surface of the lens.

In manufacturing a polarizing and photochromic optical lens by injection molding, the important issues are how to control the lens transparency and how to economically provide a variety of colors of the lenses.

According to prior art, the color of a polarizing film is deep in order to provide the film with an increased polarizing property, and, therefore, even if the lens is provided with a photochromic property, significant color tone changes cannot be expected. Furthermore, since the polarizing film must be prepared for each of a large number of different colored lenses, such manufacturing method is not economical. The present invention has been made to solve the above-described technical and economical problems.

A molded laminate having polarizing property is disclosed in Japanese Patent No. 3,681,325 issued to the inventor of the present application. According to the present invention, the laminate disclosed in this Japanese Patent No. 3,681,325 is used as the base. The base used is a laminate molding sheet, which includes a polarizing film having high light transmissivity and high polarization degree for use in liquid crystal displays, first and second cellulose triacetate films bonded to respective ones of the opposing surfaces of the polarizing film, and a resin film bonded to the surface of the first cellulose triacetate film, which resin film is compatible with a lens forming resin. An adhesive with an organic photochromic compound mixed therein is applied over the surface of the second cellulose triacetate film, and, then, a third cellulose triacetate film is disposed over the adhesive to thereby bond the third cellulose triacetate film to the second cellulose triacetate film. The third cellulose triacetate film should be free of ultraviolet light absorber.

SUMMARY OF THE INVENTION

According to an embodiment of the invention, a polarizing sheet having a thickness of 0.2 mm or smaller, a light transmissivity of 40% or greater and a polarization degree of 99.0% or greater is used. The polarizing sheet is formed by bonding first and second cellulose triacetate films to respective ones of opposing surfaces of a polarizing film. A thermoplastic film having alight transmissivity of 80% or greater and having a thickness of from 0.1 mm to 0.3 mm is bonded to the first cellulose triacetate film with an adhesive. A third cellulose triacetate film having a thickness of 0.2 mm or smaller is bonded to the second cellulose triacetate film of the polarizing sheet with an adhesive with an organic photochromic compound mixed therein, to thereby form a laminate sheet. After that, the resultant laminate sheet is hot-bent into an aimed shape in which the exposed surface of the thermoplastic film is concave and the exposed surface of the third cellulose triacetate film is convex. The hot-bent laminate sheet is then placed in an injection mold, and a molding resin compatible with the thermoplastic film is injected over the concave surface of the thermoplastic film. This completes a molded laminate for optical use having polarizing and photochromic properties.

The third cellulose triacetate film may be free of an ultraviolet absorber.

According to another embodiment of the present invention, a cellulose triacetate film having a thickness of 0.2 mm or smaller is bonded to one surface of a thermoplastic film having a thickness of from 0.1 mm to 0.3 mm with an adhesive with an organic photochromic compound mixed therein, to form a laminate sheet. The laminate sheet is then hot-bent to an aimed shape in which the exposed surface of the cellulose triacetate film is convex and the exposed surface of the thermoplastic film is concave. The hot-bent laminate sheet is then placed in an injection mold, and a molding resin compatible with the thermoplastic film is injected onto the concave surface of the thermoplastic film, which results in a molded laminate for optical use exhibiting photochromism.

The molded laminate for optical use made according to the present invention is characterized by its transparency and high degree of polarization. Furthermore, by the use of an adhesive with a organic photochromic compound mixed therein for bonding the cellulose triacetate film providing a convex surface for the resultant hot-bent molded laminate, molded laminates having different colors and/or different depths can be economically manufactured in small lots. The thus obtained transparent laminate molding sheet having polarizing and photochromic properties is subjected to thermoforming into an aimed shape, and the thermoformed laminate sheet is placed in an injection mold. Then, an optical lens forming resin is injected, to thereby form a molded laminate, which can be used for forming a polarizing lens, polarizing glasses, sporting goggles and so forth.

BEST MODE FOR CARRYING OUT THE INVENTION

Figure 1:
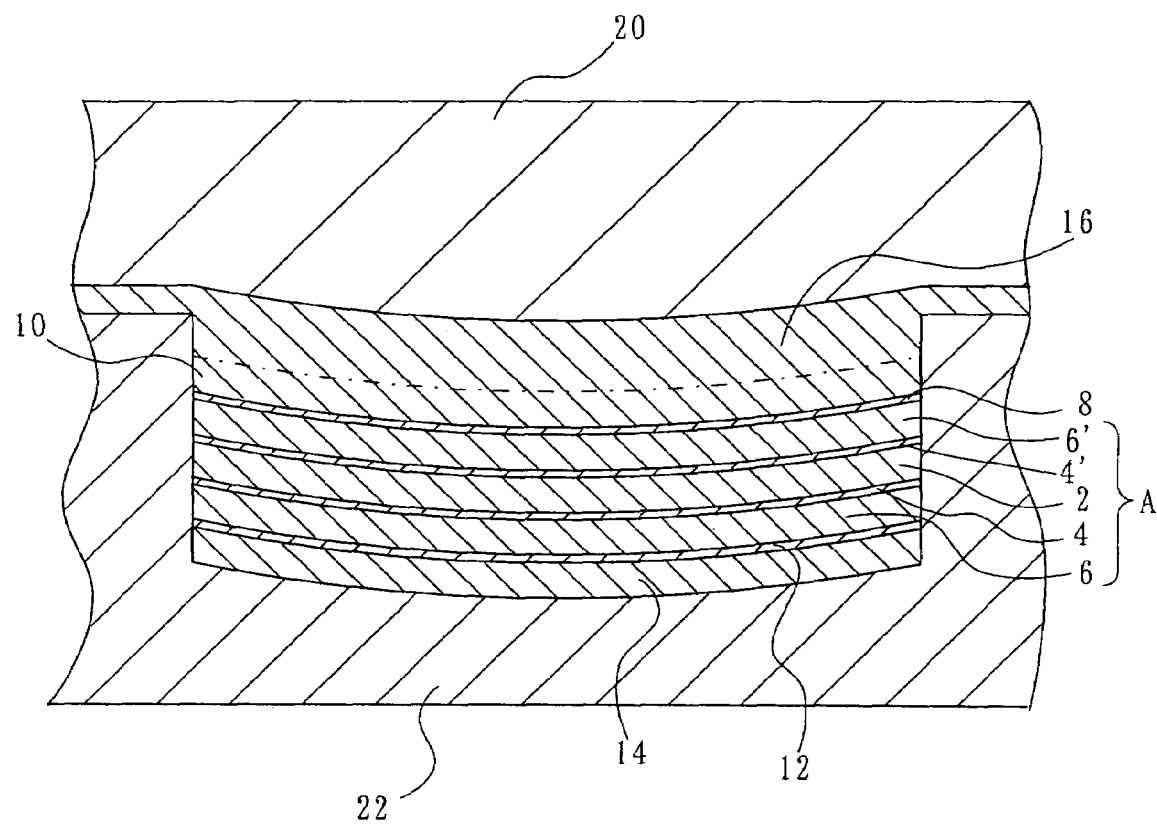
FIG. 1 is a cross-sectional view useful in describing a structure of a molded laminate for optical use according to one embodiment of the present invention.

First, referring to FIG. 1, the present invention embodied in a polarizing lens, by way of example, formed of a molded laminate for optical use according to the present invention is described.

Referring to FIG. 1, a laminate sheet includes a polarizing sheet A including first and second cellulose triacetate films 6 and 6' bonded to respective ones of the opposing surfaces of a polarizing film 2 with first and second adhesive layers 4 and 4', respectively. A thermoplastic film 10 is bonded to the second cellulose triacetate film 6' with an adhesive layer 8. A third cellulose triacetate film 14 free of an ultraviolet absorber is bonded to the first cellulose triacetate film 6 with an adhesive layer 12 with an organic photochromic compound mixed therein. The thus formed laminate sheet is hot-bent into an aimed shape like the one shown in FIG. 1 and is placed in an injection mold formed by mold parts 20 and 20'. A layer 16 is formed over the thermoplastic film 10 by injecting a lens forming resin fusible with the thermoplastic film 10.

The polarizing sheet A used in the present invention has a thickness of 0.2 mm or smaller, a light transmissivity of 40% or greater, and a polarization degree of 99.0% or greater. The polarizing film 2 forming the polarizing sheet A is formed by dyeing a polyvinyl alcohol film, which is commonly used as a base film, with a dyestuff having resistance to moist heat and drawing the resultant dyed polyvinyl alcohol film. The first and second cellulose triacetate films are adhered to the opposing surfaces of the polarizing film 2 as protective films. The thermoplastic film 10 formed on the second cellulose triacetate film 6' is compatible with or fusible with the lens forming optical resin layer 16. The thermoplastic film 10 has a light transmissivity of 80% or greater and a thickness in a range of from 0.1 mm to 0.3 mm. The thermoplastic film 16 may be a polyester resin film, a polyurethane resin film, a polyacrylic resin film, a polycarbonate resin film, a polyallylate resin film, a polyamide resin film, a polyolefin resin film, or an alloy formed of two or more of these materials.

The adhesives for bonding the films with each other or with the polarizing sheet may be, for example, a moisture-curing polyurethane adhesive, a two-component type polyisocyanate-polyester adhesive, a two-component type polyisocyanate-polyether adhesive, a two-component type polyisocyanate-polyacryl adhesive, or a two-component type polyisocyanate-polyurethane elastomer adhesive.

There are no special requirements with respect to the organic photochromic compound useable in the present invention only if it is compatible with the above-stated polyurethane based adhesive. The organic photochromic compound used in the present invention may be, for example, a known spiropyrane compound or spirooxazine compound. The amount of the organic photochromic compound to be added to the adhesive is preferably within a range of from 0.1% by weight to 10.0% by weight of the solid content of the adhesive.

The third cellulose triacetate film, which is bonded to the surface of the second cellulose triacetate film with the photochromic compound containing adhesive, may be free of an ultraviolet absorber, and has a thickness within a range of from 0.02 mm to 0.2 mm, preferably, from 0.02 mm to 0.1 mm. A film having a thickness of less than 0.02 mm has small film strength so that it may be broken during working, and a film having a thickness of more than 0.2 mm is too expensive.

The lens forming resin fusible with the thermoplastic film, which is formed over the thermoplastic film, can be selected from, for example, a polyurethane resin, a polyester resin, a polycarbonate resin, a polyallyl resin, a polyamide resin, and a polyacrylic resin, depending on the type of the thermoplastic film used.

The molded laminates for optical use thus produced according to the present invention may be used as polarizing lenses for, for example, sunglasses, sporting goggles, and prescription glasses. When used outdoors, where they receive solar light containing ultraviolet rays, the lenses can be rapidly colored to function as sunglasses, and, when used indoors where ultraviolet containing light is not incident on them, the lenses loose their color and function as transparent normal glasses.

Next, an arrangement for manufacturing, by the use of a mold, a molded laminate which can exhibit photochromism without using a polarizing sheet is described with reference to FIG. 2.

Figure 2:
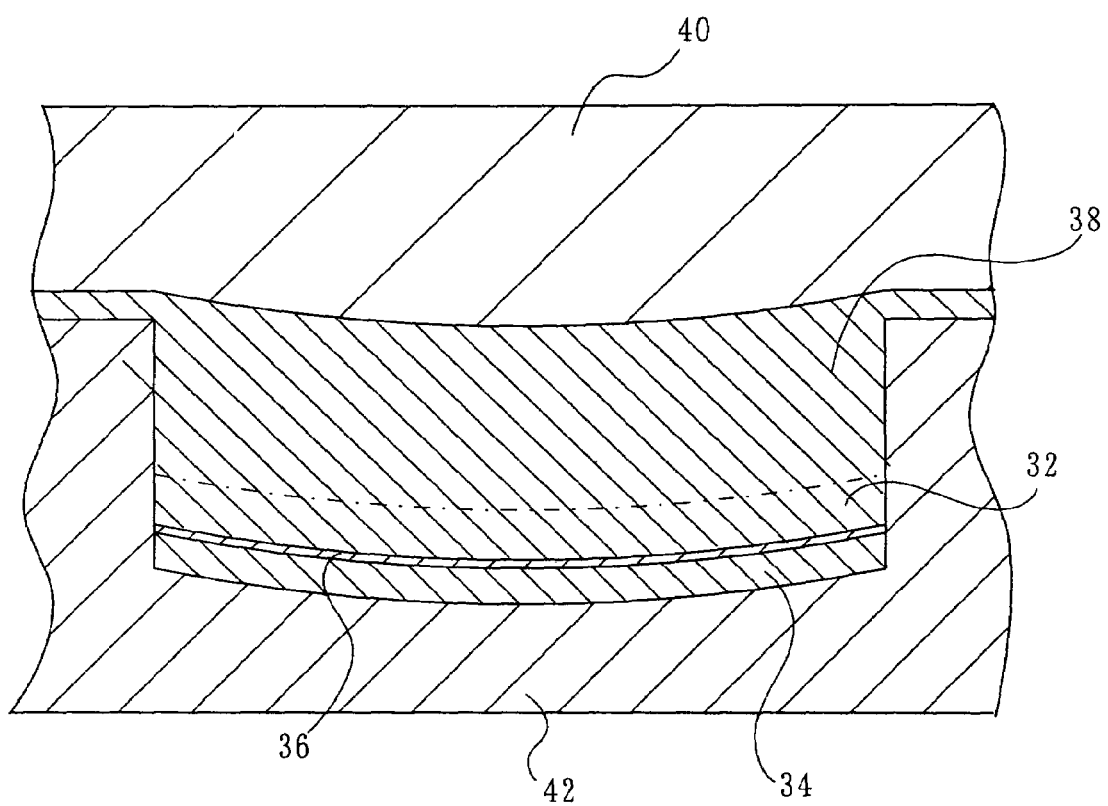
FIG. 2 is a cross-sectional view useful in describing a structure of a molded laminate for optical use according to another embodiment of the present invention.

Referring to FIG. 2, a laminate sheet includes a thermoplastic film 32 of, for example, a polyester resin, a polyurethane resin, a polyacrylic resin, a polycarbonate resin, a polyallylate resin, or a polyamide resin, and having a thickness in the range of from 0.1 mm to 0.3 mm.

The laminate sheet includes further a cellulose triacetate film 34 bonded to one surface of the thermoplastic film 32 with an interposed adhesive layer 36 containing an organic photochromic compound. The thus formed laminate sheet is hot-bent into an aimed shape, like the one shown in FIG. 2 and, after that, placed in an injection mold formed by mold parts 40 and 42. A layer 38 of a molding resin, which is fusible with the thermoplastic film 32, is formed by injecting the resin onto the other surface of the thermoplastic film 32 within the injection mold.

The thus formed molded laminates for optical use can be used as lenses, for example, sunglasses, sporting goggles, and eyesight correcting glasses. When used outdoors, where they receive solar light containing ultraviolet rays, the lenses can be rapidly colored to function as sunglasses, and, when used indoors where ultraviolet containing light is not incident on them, the lenses loose their color and function as transparent normal glasses.

Now, concrete examples of the present invention are described, but the present invention is not limited to the examples.

With respect to the polarizing optical lenses produced in the following examples, the maximum transmissivity was measured by the use of a spectrophotometer available from JASCO Corporation. A Blacklight lamp (FS-27RLR having a dominant wavelength of 365 nm) available from Sankyo Denki, was used as an ultraviolet light source in the measurement of coloring, and a 500 W xenon lamp (UI-502Q) available from USHIO Inc., was used as a visible light source in determining disappearance of color of the lenses.

EXAMPLE 1

A polarizing sheet available from Sumitomo Chemical Company, Limited, known as SUMIKALAN® SQ-1852A, having a thickness of 0.18 mm and a light transmissivity of 43.7%, was used. The polarizing sheet includes first and second cellulose triacetate films each having a thickness of 0.08 mm onto the respective opposing surfaces of a polarizing film of polyvinyl alcohol dyed with an iodine-type dyestuff. The polarizing film has a thickness of 0.02 mm and a degree of polarization of 99.95%. A polycarbonate resin film having a thickness of 0.15 mm and having a light transmissivity of 89%, which is compatible and fusible with a lens molding polycarbonate resin, was bonded to the exposed surface of the first cellulose triacetate film of the polarizing sheet, using a two-component type polyurethane resin as the adhesive.

Then, a third cellulose triacetate film, which was free of an ultraviolet absorber and had a thickness of 0.05 mm, was bonded to the exposed surface of the second cellulose triacetate film with an adhesive layer having a thickness of 0.01 mm applied over the exposed surface of the second cellulose triacetate film. The adhesive was a two-component type polyether polyurethane resin to which 3.0% by weight, to the solid content of the two-component type polyether polyurethane resin, of a photochromic compound was added. The photochromic compound used was:

6'-(2,3-dihydro-1H-indole-1-yl)-1,3-dihydro-3,3-dimethyl-1-propyl-spiro[2H-indole-2,3'-(3H)-naphtho(2,1-b)(1,4)oxazine] commercially available by the trade name of Reversacol Midnight Grey from James Robinson, Ltd.

The resultant laminate sheet was subjected to hot bending into a shape in which the exposed surface of the third cellulose triacetate is convex, with the exposed surface of the polycarbonate film exhibiting concavity. The hot-bent laminate sheet was then placed in an injection mold, and a polycarbonate resin for optical use was injected onto the concave surface of the polycarbonate film. This resulted in a polarizing optical lens having a thickness of 2.0 mm. When using this polarizing lens for glasses, the third triacetate film faces outward, away from the eye, and the injected polycarbonate resin faces the eyes.

Immediately after being illuminated with visible light rays, the lens exhibited a light transmissivity of 43%, and, immediately after being illuminated with ultraviolet light rays for five (5) minutes, it exhibited a light transmissivity of 15%.

EXAMPLE 2

A polyallylate film, which had a thickness of 0.14 mm, exhibited a light transmissivity of 88%, and was compatible or fusible with a lens molding polyallilate resin, was bonded to the exposed surface of the first cellulose triacetate film of the same polarizing sheet as used in Example 1, by the use of a two-component polyether polyurethane resin adhesive.

Then, over the exposed surface of the second cellulose triacetate film, an adhesive was applied to a thickness of 0.01 mm, by means of which a third cellulose triacetate film free of an ultraviolet absorber having a thickness of 0.05 mm was bonded to the second cellulose triacetate film to thereby obtain a laminate sheet. The adhesive used to bond the third cellulose triacetate film to the second one was a two-component type polyester polyurethane resin to which 1.5% by weight, to the solid content of the two-component type polyester polyether resin, of the following was added:

1-(2-methoxy-5-nitrobenzyl)-3,3-dimethylspiro[indolin-2, 3'-(3H)-naphtho(2,1-b)-pyran].

This material is commercially available from KUREHA Corporation.

As in Example 1, the polarizing sheet was subjected to hot bending in such a manner as to make exposed surface of the third cellulose triacetate film exhibit convexity and to make the exposed surface of the polyallylate film exhibit concavity. The hot-bent polarizing sheet was placed in an injection mold, where a polyallylate resin for optical use was injected over the concave surface of the polyallylate film, which resulted in a polarizing optical lens having a thickness of 2.0 mm. The lens exhibited a light transmissivity of 42.7% immediately after it was illuminated with visible light rays, and the light transmissivity of the lens immediately after being illuminated with ultraviolet rays for five (5) minutes was 25%.

EXAMPLE 3

A polycarbonate resin and a polybutylene terephthalate were uniformly blended in a weight ratio of 60:40, from which a transparent thermoplastic film having a thickness of 0.2 mm was prepared. Over the thus prepared transparent plastic film, the two-component type polyether polyurethane adhesive containing the photochromic compound same as used in Example 1 was applied to a thickness of 0.02 mm, over which a cellulose triacetate film free of an ultraviolet absorber having a thickness of 0.05 mm was placed to form a laminate sheet.

The laminate sheet was subjected to hot bending to a shape in which the exposed cellulose triacetate film exhibited convexity, while the exposed surface of the thermoplastic film exhibited concavity. The hot-bent laminate sheet was placed in an injection mold, and the same resin as the thermoplastic film was injected over the exposed surface of the thermoplastic film, to thereby form an optical lens having a thickness of 2.0 mm.

The light transmissivity of this lens immediately after illuminating it with visible light rays was 87%, and the light transmissivity immediately after the illumination for five (5) minutes with ultraviolet rays was 39%.

EXAMPLE 4

A transparent polyacrylic film having a thickness of 0.25 mm was formed from a mixture prepared by uniformly blending a polymethyl methacrylate resin and a polybutyl acrylate resin in a weight ratio of 80:20. The photochromic compound containing two-component type polyester polyurethane adhesive as used in Example 2 was applied to a thickness of 0.02 mm over a surface of the transparent polyacrylic film, and, then, a cellulose triacetate film free of an ultraviolet absorber having a thickness of 0.04 mm was placed to form a laminate sheet.

The resultant laminate sheet was subjected to hot bending in the same manner as Example 3, and the hot-bent laminate sheet was placed in an injection mold. A polymethyl methacrylate resin was injected over the transparent polyacrylic film, to thereby obtain an optical lens having a thickness of 2.0 mm.

The lens of Example 3 exhibited a light transmissivity of 90% immediately after being illuminated with visible light rays, and exhibited a light transmissivity of 38% immediately after being illuminated with ultraviolet rays for five (5) minutes.

What is claimed is:

1. A molded laminate for optical use having polarization and photochromic properties, comprising a laminate sheet comprising:

a polarizing sheet having a thickness of not greater than 0.2 mm, a light transmissivity of not smaller than 40%, and a polarization degree of not smaller than 99.0%, said polarizing sheet comprising a polarizing film and first and second cellulose triacetate films bonded to respective ones of opposing surface of said polarizing film;

a thermoplastic film having a thickness of from 0.1 mm to 0.3 mm and a light transmissivity of not smaller than 80%, said thermoplastic film being bonded to an exposed surface of said first cellulose triacetate film with an adhesive; and a third cellulose triacetate film having a thickness of not greater than 0.2 mm bonded an exposed surface of said second cellulose triacetate film with an adhesive containing an organic photochromic compound;

said laminate sheet being subjected to hot bending into an aimed shape in which an exposed surface of said third cellulose triacetate exhibits convexity, and an exposed surface of said thermoplastic film exhibits concavity, and, after that, said hot-bent polarizing sheet being placed in an injection mold, and a molding resin material fusible with said thermoplastic film is injected onto said thermoplastic film, to thereby complete said molded laminate.

2. The molded laminate according to claim 1, wherein said third cellulose triacetate film is free of an ultraviolet absorber.

3. A molded laminate for optical use having a photochromic property, comprising a laminate sheet comprising:

a thermoplastic film having a thickness of from 0.1 mm to 0.3 mm; and a cellulose triacetate film having a thickness of not greater than 0.2 mm bonded to one of opposing surfaces of said thermoplastic film with an adhesive containing an organic photochromic compound;

said laminate sheet being subjected to hot bending into an aimed shape in which an exposed surface of said cellulose triacetate film exhibits convexity, and an exposed surface of said thermoplastic film exhibits concavity, and, after that, said hot-bent laminate sheet being placed in an injection mold, where a molding resin material fusible with said thermoplastic film is injected onto said thermoplastic film, to thereby complete said photochromic molded laminate.

* * * * *